US011053881B2

(12) United States Patent
Garimella et al.

(10) Patent No.: US 11,053,881 B2
(45) Date of Patent: *Jul. 6, 2021

(54) HIERARCHICAL ENGINE CONTROL SYSTEMS AND METHODS

(71) Applicant: CUMMINS INC., Columbus, IN (US)

(72) Inventors: Phanindra V. Garimella, Bloomington, IN (US); Paul V. Moonjelly, Columbus, IN (US); Edmund P. Hodzen, Columbus, IN (US); Ming-feng Hsieh, Nashville, IN (US); Gayatri Adi, Columbus, IN (US); Gokul Vishwanathan, Olney, MD (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/762,469

(22) PCT Filed: Oct. 14, 2015

(86) PCT No.: PCT/US2015/055451
§ 371 (c)(1),
(2) Date: Mar. 22, 2018

(87) PCT Pub. No.: WO2017/065756
PCT Pub. Date: Apr. 20, 2017

(65) Prior Publication Data
US 2018/0266340 A1    Sep. 20, 2018

(51) Int. Cl.
*F02D 41/24* (2006.01)
*F02D 41/14* (2006.01)
(Continued)

(52) U.S. Cl.
CPC ......... *F02D 41/2432* (2013.01); *F02D 35/02* (2013.01); *F02D 35/025* (2013.01);
(Continued)

(58) Field of Classification Search
CPC ............ F02D 41/2432; F02D 41/0002; F02D 41/0007; F02D 41/1446; F02D 41/1454;
(Continued)

(56) References Cited

U.S. PATENT DOCUMENTS 6,026,793 A * 2/2000 Yasui ................. F02D 41/1402
                                                   123/674
6,397,830 B1 * 6/2002 Dohta ................ F02D 41/1402
                                                   123/674
(Continued)

FOREIGN PATENT DOCUMENTS

CN        104603434 A     5/2015
JP        4961336 B2      6/2012
(Continued)

OTHER PUBLICATIONS

International Search Report and Written Opinion dated Dec. 28, 2015 in PCT/US2015/055451.
(Continued)

*Primary Examiner* — Mahmoud Gimie
(74) *Attorney, Agent, or Firm* — Faegre Drinker Biddle & Reath LLP

(57) ABSTRACT

A system for control of an internal combustion system having subsystems, each with different response times. Subsystems may include a fuel system, an air handling system, and an aftertreatment system, each being operated in response to a set of reference values generated by a respective target determiner. Calibration of each subsystem may be performed independently. The fuel system is controlled at a first time constant. The air handling system is controlled on the order of a second time constant slower than the first time constant. The aftertreatment system is controlled on the order of a third time constant slower than the second time constant. A subsystem manager is optionally in operative communication with each target determiner to coordinate (Continued)

control. Generally, dynamic parameters from slower subsystems are treated as static parameters when determining reference values for controlling a faster subsystem.

24 Claims, 3 Drawing Sheets

(51) Int. Cl.
  *F02D 41/38* (2006.01)
  *F02D 41/40* (2006.01)
  *F02D 41/00* (2006.01)
  *F02D 35/02* (2006.01)
(52) U.S. Cl.
  CPC ..... *F02D 41/0002* (2013.01); *F02D 41/0007* (2013.01); *F02D 41/1446* (2013.01); *F02D 41/1454* (2013.01); *F02D 41/1462* (2013.01); *F02D 41/3836* (2013.01); *F02D 41/40* (2013.01); *F02D 2041/1412* (2013.01); *F02D 2041/1431* (2013.01); *F02D 2041/1433* (2013.01); *F02D 2200/101* (2013.01); *F02D 2250/31* (2013.01); *F02D 2250/36* (2013.01); *Y02T 10/12* (2013.01); *Y02T 10/40* (2013.01)
(58) Field of Classification Search
  CPC .. F02D 41/1462; F02D 41/3836; F02D 41/40; F02D 35/02; F02D 35/025; F02D 2041/1412; F02D 2041/1431; F02D 2041/1433; F02D 2200/101; F02D 2050/31; F02D 2050/36
  USPC ........................................................ 701/101
  See application file for complete search history.

(56) References Cited

U.S. PATENT DOCUMENTS

| | | | |
|---|---|---|---|
| 6,725,650 B2 | 4/2004 | Nishimura | |
| 7,337,060 B2 | 2/2008 | Kienle et al. | |
| 7,457,701 B2 | 11/2008 | Tanaka | |
| 7,756,688 B2 | 7/2010 | Averill et al. | |
| 7,813,867 B2 | 10/2010 | Yasui et al. | |
| 8,256,206 B2* | 9/2012 | Wada | F01N 3/0842 60/274 |
| 8,478,507 B2 | 7/2013 | Sata | |
| 9,133,811 B2 | 9/2015 | Takahashi et al. | |
| 9,435,274 B2 | 9/2016 | Wong et al. | |
| 9,732,688 B2 | 8/2017 | Cygan et al. | |
| 9,863,345 B2 | 1/2018 | Wong et al. | |
| 9,863,352 B2 | 1/2018 | Stenlaas et al. | |
| 10,035,500 B2 | 7/2018 | Stenlaas et al. | |
| 2005/0022510 A1 | 2/2005 | Nakagawa et al. | |
| 2005/0161032 A1* | 7/2005 | Nakagawa | F02D 41/1495 123/673 |
| 2007/0017210 A1 | 1/2007 | Hirata et al. | |
| 2007/0245714 A1 | 10/2007 | Frazier et al. | |
| 2008/0172169 A1 | 7/2008 | Kuronita et al. | |
| 2009/0007888 A1 | 1/2009 | Sarlashkar et al. | |
| 2009/0178656 A1 | 7/2009 | Saitoh | |
| 2009/0223205 A1 | 9/2009 | Grissom et al. | |
| 2009/0287390 A1 | 11/2009 | Mizuno et al. | |
| 2010/0024390 A1 | 2/2010 | Wills et al. | |
| 2010/0024787 A1 | 2/2010 | Chi | |
| 2010/0043400 A1 | 2/2010 | Wang et al. | |
| 2010/0043402 A1 | 2/2010 | Perry et al. | |
| 2010/0168983 A1 | 7/2010 | Ruiz | |
| 2010/0235141 A1 | 9/2010 | Wang et al. | |
| 2010/0242440 A1 | 9/2010 | Garimella et al. | |
| 2011/0016849 A1* | 1/2011 | Runde | F02D 41/222 60/276 |
| 2011/0162350 A1 | 7/2011 | Ponnathpur | |
| 2011/0162628 A1 | 7/2011 | Kurtz et al. | |
| 2011/0184632 A1 | 7/2011 | Kang et al. | |
| 2011/0214650 A1 | 9/2011 | Wang et al. | |
| 2011/0264353 A1 | 10/2011 | Atkinson et al. | |
| 2012/0137660 A1 | 6/2012 | Yan et al. | |
| 2013/0024094 A1 | 1/2013 | Shaver et al. | |
| 2013/0029852 A1 | 1/2013 | Rava et al. | |
| 2013/0067894 A1 | 3/2013 | Pekar et al. | |
| 2013/0226420 A1 | 8/2013 | Pedlar et al. | |
| 2013/0298525 A1 | 11/2013 | Lim et al. | |
| 2014/0058645 A1* | 2/2014 | Stroh | F02D 41/1497 701/103 |
| 2014/0109868 A1 | 4/2014 | Zhu et al. | |
| 2014/0260190 A1 | 9/2014 | Degeorge | |
| 2015/0128683 A1 | 5/2015 | Kumano et al. | |
| 2015/0167567 A1 | 6/2015 | Stroh et al. | |
| 2016/0123258 A1 | 5/2016 | Lack et al. | |
| 2016/0281574 A1 | 9/2016 | Abel et al. | |
| 2018/0266343 A1 | 9/2018 | Garimella et al. | |
| 2018/0266348 A1 | 9/2018 | Garimella et al. | |
| 2018/0274467 A1 | 9/2018 | Garimella et al. | |
| 2018/0274475 A1 | 9/2018 | Garimella et al. | |
| 2018/0347497 A1 | 12/2018 | Moore et al. | |

FOREIGN PATENT DOCUMENTS

| | | |
|---|---|---|
| WO | 20131032844 A1 | 3/2013 |
| WO | 2014/055307 A1 | 4/2014 |
| WO | 2014/193333 A1 | 12/2014 |

OTHER PUBLICATIONS

Non-Final Office Action issued by the United States Patent and Trademark Office dated Feb. 30, 2019 in U.S. Appl. No. 15/762,465; 53 pages.
Non-Final Office Action issued by the United States Patent and Trademark Office dated Jan. 2, 2020 in U.S. Appl. No. 15/762,461; 34 pages.
Final Office Action issued by the United States Patent and Trademark Office dated May 1, 2020 in U.S. Appl. No. 15/762,467; 16 pages.
Notice of Allowance and Fee(s) Due issued by the United States Patent and Trademark Office dated May 15 2020 in U.S. Appl. No. 15/762,472; 5 pages.
Christen, et al.; "IMO Tier 3; Gas and Dual Fuel Engines as a Clean and Efficient Solution", CIMAC Congress 2013.
Cleslar, "Control for Transient Response of Turbocharged Engines", University of Cambridge, Mar. 2013.
Delgado et al., "Advanced Tractor-Trailer Efficiency Technology Potential in the 2020-2030 Timeframe", The International Council on Clean Transportation. Washington, DC, Apr. 2015.
Mancini et al., "Dynamic Feedforward Control of a Diesel Engine Based on Optimal Transient Compensation Maps", In: Engines, Aug. 21, 2014.
Vu et al.; "A Model Predictive Control Approach for Fuel Economy Improvement of a Series Hydraulic Hybrid Vehicle", In: Engines, Oct. 31, 2014.
Non-Final Office Action received for U.S. Appl. No. 15/762,472, dated Jul. 11, 2019, 10 pages.
Notice of Allowance received for U.S. Appl. No. 15/762,472, dated Jan. 23, 2020, 5 pages.

* cited by examiner

HIERARCHICAL ENGINE CONTROL SYSTEMS AND METHODS

RELATED APPLICATIONS

The present application is a national phase filing under 35 U.S.C. § 371 of International Application No. PCT/US2015/055451, titled "HIERARCHICAL ENGINE CONTROL SYSTEMS AND METHODS," filed on Oct. 14, 2015, the entire disclosure of which being expressly incorporated herein by reference.

The present application discloses subject matter similar to the subject matter disclosed in the following applications: U.S. application Ser. No. 15/762,461, filed Mar. 22, 2018, which is a National Stage Entry of PCT/US2015/055447; U.S. application Ser. No. 15/762,465 filed Mar. 22, 2018, which is a National Stage Entry of PCT/US2015/055451; U.S. application Ser. No. 15/762,472 filed Mar. 22, 2018, which is a National Stage Entry of PCT/US2015/055452; and U.S. application Ser. No. 15/762,467 filed Mar. 22, 2018, which is a National Stage Entry of PCT/US2015/055448.

TECHNICAL FIELD

The present disclosure relates generally to internal combustion engines. In particular, the disclosure relates to controlling internal combustion engines with subsystems having different response times.

BACKGROUND

Engine systems including internal combustion engines are often required to meet performance in several areas. While delivering requested amounts of power, engines are also often required to operate efficiently in terms of resource consumption and meet low emission requirements, such as EPA Tier 4 Final requirements for smoke and $NO_X$ emissions. These goals are often governed by trade-offs, such as targeting greater power delivery while also targeting less fuel consumption. Engine systems are often calibrated to manage the trade-offs to achieve the overall goals.

An engine system often includes one or more subsystems, such as a fuel subsystem, an air handling subsystem, and an aftertreatment subsystem. Integrated calibration utilizing complex modeling of the entire engine system with all subsystems is often performed in order to adequately capture behavior and interactions between subsystems, which contributes to long calibration cycles. Another factor contributing to long calibration cycles is that engine systems are often calibrated to meet performance requirements under varying conditions, such as steady state, multiple transient states, and all at various altitudes. With ever more demanding performance goals, there remains a continuing need to robustly and time-efficiently calibrate engine systems and to control engine systems in operation to provide power, minimize resource consumption, and meet emissions requirements.

SUMMARY

Certain aspects of the disclosure relate to a system comprising a fuel system having a first response time; an air handling system having a second response time, the second response time being slower than the first response time; an aftertreatment system having a third response time, the third response time being slower than the second response time; and a controller.

Some embodiments of the controller are configured to interpret a first basis variable set for the fuel system, a second basis variable set for the air handling system, and a third basis variable set for the aftertreatment system; determine a first reference value set in response to the first basis variable set within a first time period determined in response to the first response time; determine a second reference value set in response to the second basis variable set within a second time period determined in response to the second response time; determine a third reference value set in response to the third basis variable set within a third time period determined in response to the third response time; and provide one or more control commands to each of the fuel system, the air handling system, and the aftertreatment system in response to the first reference value set, the second reference value set, and the third reference value set, respectively.

Further embodiments of the controller are configured to interpret operational information. Additional embodiments of the controller are configured to iteratively modify at least one of the first reference value set, the second reference value set, and the third reference value set in response to the operational information. Various embodiments of the controller model the operational information at least one time step ahead and to further selectively modify at least one of the first reference value set, the second reference value set, and the third reference value set in response to the modeled operational information.

Some aspects of the disclosure relate to a controller comprising a system parameter definer structured to interpret an aftertreatment basis variable set, an air handling basis variable set including an aftertreatment system value, and a fueling basis variable set including at least one of an aftertreatment system value and an air handling system value; an aftertreatment target determiner structured to determine an aftertreatment reference value set in response to the aftertreatment basis variable set; an air handling target determiner structured to determine an air handling reference value set in response to the air handling basis variable set; and a fueling target determiner structured to determine a fueling reference value set in response to a fueling basis variable set. The controller optionally includes a system control circuit comprising at least one of a fuel control circuit, an air handling control circuit, and an aftertreatment control circuit and structured to provide one or more control commands in response to the first reference value set, the second reference value set, and the third reference value set.

Additional aspects of the disclosure relate to a method comprising interpreting a first basis variable set for a fuel system having a first response time; determining a first reference value set for a fuel control commander in response to the first basis variable set within a first time period determined in response to the first response time; interpreting a second basis variable set for an air handling system having a second response time being slower than the first response time; determining a second reference value set for an air handling control commander in response to the second basis variable set within a second time period determined in response to the second response time; interpreting a third basis variable set for an aftertreatment system having a third response time being slower than the second response time; determining a third reference value set for an aftertreatment control commander in response to the third basis variable set within a third time period determined in response to the third response time; and providing one or more control commands to each of the fuel system, the air handling system, and the aftertreatment system in response to the first reference value set, the second reference value set, and the third reference value set, respectively.

Yet further aspects of the disclosure relate to a method comprising interpreting a third basis variable set for an aftertreatment system; determining a third reference value set for an aftertreatment control commander in response to a third basis variable set; interpreting a second basis variable set for an air handling system, the second basis variable set including an aftertreatment system value; determining a second reference value set for an air handling control commander in response to the second basis variable set; interpreting a first basis variable set for a fuel system, the first basis variable set including at least one of an aftertreatment system value and an air handling system value; and determining a first reference value set for a fuel control commander in response to the first basis variable set.

While multiple embodiments are disclosed, still other embodiments of the present invention will become apparent to those skilled in the art from the following detailed description, which shows and describes illustrative embodiments of the invention.

Figure 1:
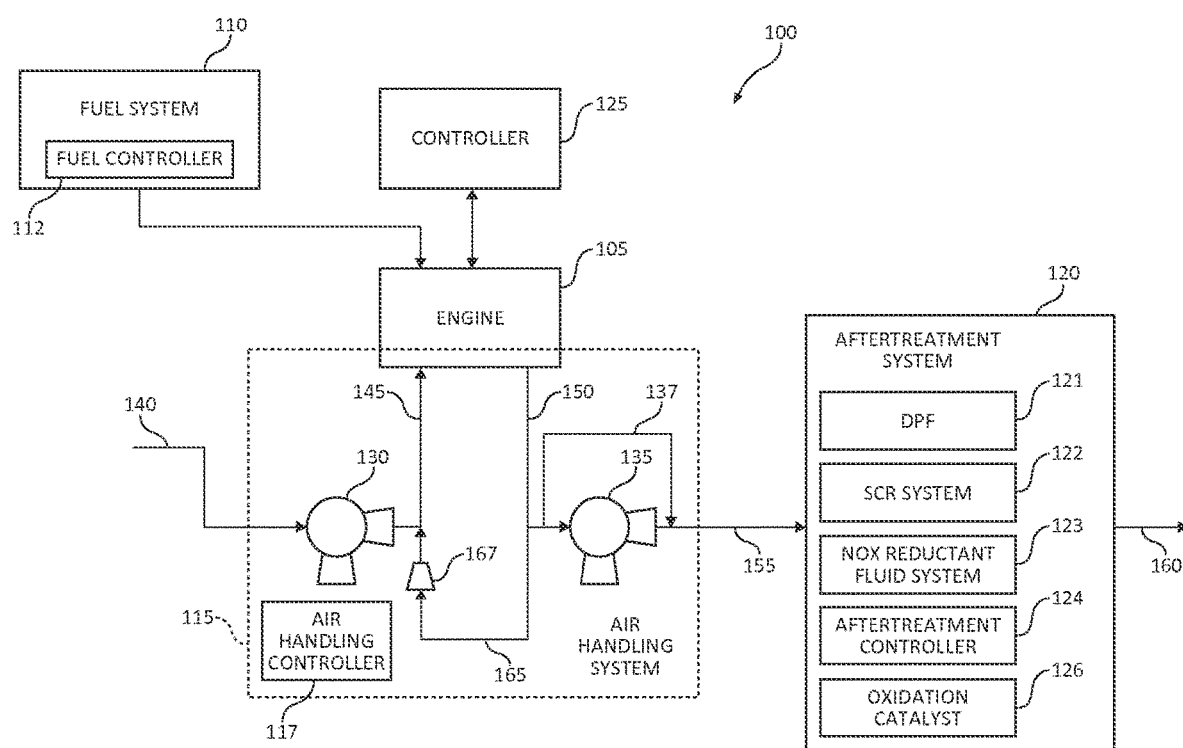
FIG. 1 is a schematic illustration of an engine system including a fuel subsystem, an air handling subsystem, and an aftertreatment subsystem, according to some embodiments of the disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic illustration of an engine system 100 utilizing reference values to control system performance at various time constants, according to some embodiments of the disclosure. The system 100 cooperatively controls system components, such as subsystems, to provide engine performance within a specification or a requirement set of the system 100. As shown, the system 100 includes an engine 105 and various subsystems, such as a fuel system 110, an air handling system 115, and an aftertreatment system 120 (which are also considered subsystems to the overall system 100). An example system 100 includes a controller 125 (e.g., ECM) in operative communication with the engine 105, which provides and receives signals related to various engine components, such as receiving measurement signals from sensors disposed in the engine 105 and providing control signals or commands to the subsystems.

The example controller 125 is in operative communication with other components of the system 100, such as the subsystems 110, 115, 120, in a similar manner. As used herein throughout, operative communication means an operative coupling by wire, wirelessly, mechanically, electronically, optically, magnetically, by network, et cetera, or any suitable combinations thereof.

Real-time or online controllers for internal combustion engines, particularly in vehicle applications are notoriously resource limited in processing performance and capability due to size limitations, cost pressures for mass production, requirements to robustly function in harsh environments due to the use of inexpensive and non-state-of-the-art computing equipment. Previously known engine control systems in the art rely on the generation of tables calibrated to provide operating commands in response to a variety of operating conditions. Robust control based on calibration tables alone involves numerous tables and results in certain disadvantages. Generating numerous tables require a long calibration period on the limited hardware. The numerous tables must be stored in limited memory. Due to processing time and memory constraints, not all operating conditions can be calibrated, so when conditions arise during operation that are not calibrated, the engine system must run at some nominal or un-calibrated states.

Various embodiments of the system 100 according to this disclosure are capable of robust control while reducing the amount of tables to be calibrated and memory required by operating in response to the fundamental principles of physics within the subsystems. Overall processing requirements are also reduced by reserving faster processing capabilities for subsystems that require faster processing in response to the time dynamics and related response times (or speeds) of each subsystem.

Some embodiments of the system 100 decouple the generation of reference values (e.g., target values) from the generation of command values. The example system 100 generates one or more reference values in response to one or more basis variables. The reference values provide target values for each subsystem's performance. Though many variables can affect subsystem performance, key basis variables are selected to characterize a majority of effects in the subsystem based on fundamental physical principles. By calibrating the system 100 in response to the one or more key basis variables, the system can be calibrated for a reduced set of operating conditions, which reduces the number of tables generated and stored during calibration, thereby reducing the processing time or power required during calibration and memory storage requirements. For example, the example system 100 is calibrated for one or more of a steady state condition, a cold start condition, and a regeneration condition without another set of tables for various altitudes.

One or more commands are generated in response to the target values. In some embodiments, the commands are the reference values. In other embodiments, the command values are adjusted in response to physical or emissions constraints (or objectives) of the particular subsystem. Non-limiting examples of commands include a start-of-injection (SOI) (including main, pilot, and post), a rail pressure, a fuel injection, a mass charge flow (MCF), an exhaust gas recirculation (EGR) fraction, a pumping work target, a target selective catalytic reduction (SCR) conversion efficiency, a target system out $NO_X$, a target ammonia slip, and a trajectory (over time) of any of the foregoing parameters.

Various embodiments decouple the generation of target values (and associate command values) for each subsystem.

Such a configuration utilizes an organized a flow of parameters among the subsystems having different time constants (related to dynamics and response times) so that the processing subsystem can treat parameters from slower subsystems as static. For example, each of the example subsystems 110, 115, 120 has a different response time. The response times may be so different that each subsystem responds on a different order of magnitude than other subsystems in the system 100. The fuel subsystem 110 has a response time on the order of milliseconds. The example air handling subsystem 115 has a response time on the order of seconds. The example aftertreatment subsystem 120 has a response time on the order of minutes. The example system 100 overall also has a cumulative emissions requirement measured on the order of several minutes or hours. Response speed is proportional to response time in the sense that a faster response speed corresponds to a faster response time (e.g., responds in less time). The example controller 125 is calibrated for operation to perform operations to robustly control the example system 100 utilizing these varying response times to reduce processing requirements, especially for the slower subsystems.

Calibration of each subsystem is independent of the calibration of the other subsystems. Advantages are realized during calibration, such that when an improved value for a subsystem is identified in the middle of engine calibration, that value can be used to update the calibration for that subsystem. In this manner, the calibration for the entire system need not be restarted, which avoids rework while improving robustness. In some embodiments, the system is calibrated by sequentially calibrating the subsystems. An example calibration begins with a set of basis variables for a fuel system target determiner, which optionally includes a state of the air handling subsystem and/or a state of the aftertreatment subsystem treated as static, and the fuel system target determiner is calibrated for providing target values to the fuel subsystem controller. The calibration continues with a set of basis variables for the air handling system target determiner, which optionally includes a state of the aftertreatment subsystem treated as static, and the air handling target determiner is calibrated for providing target values to the air handling subsystem controller. Then, the calibration moves on with a set of basis variables for the aftertreatment system target determiner, and the aftertreatment target determiner is calibrated for providing target values to the aftertreatment subsystem controller. As a particular target determiner is calibrated, the discovery of an improved variable or relationship between variables, which affects subsystem performance, can be incorporated into a recalibration for the particular target determiner only. For example, if the air handling subsystem for a calibrated air handling target determiner changes an air handling component (e.g., turbocharger), the calibrations of the fueling target determiner and the aftertreatment target determiner need not be recalibrated. Because calibration for a particular subsystem is not dependent on the calibration of another subsystem, only the air handling target determiner could be recalibrated. Therefore, advantages in calibration time and/or effort are facilitated, especially when parts of the subsystems change or otherwise need to be recalibrated for different targets.

Turning now to the components of the system 100, the fuel system 110 is in operative communication with the engine 105 and provides fuel for combustion. The fuel system 110 delivers a fueling amount at one or more specific times to one or more cylinders during each combustion cycle. In some embodiments, the fuel is fed through an injector directly into an engine cylinder, for example, when the engine 105 uses diesel fuel. In other embodiments, the fuel is mixed with air charge before entering an engine cylinder, for example, when the engine 105 uses gasoline or natural gas fuel. The physical components of the fuel system 110 may be controlled by physical fuel controller 112. The fuel controller 112 provides control signals to the physical components of the fuel system 110, such as a fuel pressure pump and fuel injectors, in response to one or more fueling command values.

The air handling system 115 provides air to the engine 105 for combustion with fuel. An example air handling system 115 includes an air handling controller 117 in operative communication with one or more components of the air handling system to provide control signals to the physical air handling system components in response to one or more command values. As illustrated, the air handling system 115 includes an optional turbocharging system including at least one turbocharger, each including a compressor 130 and a turbine 135. The turbocharging system receives exhaust and provides compressed air. In some embodiments, the compressor 130 is driven by the turbine 135 in a turbocharging configuration, wherein the compressor 130 is the air intake side of a turbocharger and the turbine 135 is the exhaust side of the turbocharger. In various embodiments, the turbocharging system of the air handling system 115 includes a waste gate 137 for bypassing the turbine 135 to control the speed of the turbine 135 and compressor 130, for example, to avoid excessive speed. In other embodiments, the turbocharging system includes a variable geometry turbocharger (VGT), which facilitates controlling the speed of the turbine 135 and compressor 130.

The example system includes a wastegate turbocharger. However, the air handling system 115 may include any type of air handling system, including without limitation a naturally aspirated system, a fixed geometry turbocharger, a variable geometry turbocharger, a compressor bypass turbocharger, a dual turbocharger (series or parallel), and combinations thereof.

The system 100 includes a system air intake 140 into which air enters from the ambient environment. The air flows into and out of the compressor 130 to engine air intake 145. The engine 105 may include an intake manifold operatively coupled to the engine air intake 145 to deliver the air to the intake ports of the cylinders. The system may include an intercooler, charger air cooler (not shown), and/or bypass systems therefore. After combustion, exhaust flows from the engine 105 to engine exhaust 150. The engine 105 may include an exhaust manifold operatively coupled to the exhaust ports of the cylinders to collect the exhaust and direct the exhaust to the engine exhaust 150.

Some of the exhaust is directed into an exhaust gas recirculation (EGR) system that is also part of the air handling system 115. The EGR system directs a portion of the exhaust to EGR pathway 165 to engine air intake 145. The EGR system may include an EGR valve 167 to control the flow (e.g., EGR fraction) of exhaust gases back to the engine air intake 145. The example EGR system is a high pressure EGR system having the EGR pathway 165 being coupled upstream of the turbine 135 and downstream of the compressor 130. Some embodiments, alternatively or in addition, include a low pressure EGR system having the EGR pathway 165 being coupled downstream of the turbine 135 and upstream of the compressor 130. The exhaust flows into and out of the turbine 135 to aftertreatment inlet 155.

The example EGR system may additionally or alternatively include an EGR cooler (not shown) structured to cool the exhaust in the EGR pathway 165. The EGR valve 167 may be positioned upstream (hotside) or downstream (coolside) of the EGR cooler. Where present, the EGR cooler may additionally be provided with a bypass valve.

The aftertreatment system 120 receives the exhaust from aftertreatment inlet 155 and at least a portion of the exhaust is expelled at the aftertreatment outlet 160, which may also be referred to as the system outlet or tailpipe. The aftertreatment system 120 includes devices to treat emissions before exiting the tailpipe, such as one or more of a particulate filter or diesel particulate filter (DPF) 121, a selective catalytic reduction (SCR) system 122 to chemically reduce components of the exhaust, a $NO_X$ reductant fluid system 123 (e.g., a diesel exhaust fluid system) to provide $NO_X$ reductant fluid to the exhaust, and an oxidation catalyst 126 to chemically oxidize components of the exhaust. The aftertreatment controller 124 is in operative communication with one or more of the aftertreatment components 121, 122, 123, 126 to provide control signals to physical components of the aftertreatment system in response to one or more command values. The EGR system may also be considered part of the aftertreatment system 120.

The controller 125 performs certain operations to control one or more subsystems of an internal combustion engine, such as one or more of a fuel system 110, an air handling system 115, and an aftertreatment system 120. In certain embodiments, the controller 125 forms a portion of a processing subsystem including one or more computing devices having memory, processing, and communication hardware. The controller 125 may be a single device or a distributed device, and the functions of the controller may be performed by hardware and/or as computer instructions on a non-transient computer readable storage medium.

The logical relationship among the controllers and their functionality may be implemented in any known manner. Physical controllers 112, 117, and 124 are shown as separate from controller 125 in FIG. 1. However, any number of these controllers may alternatively be implemented as part of controller 125. For example, the controllers may be implemented in a single physical device, or in another example, as a distributed device.

In certain embodiments, the controller 125 includes one or more definers, determiners, commanders, and control circuits that functionally execute the operations of the controller. The description herein including definers, determiners, commanders, and/or control circuits emphasizes the structural independence of certain aspects of the controller 125, and illustrates one grouping of operations and responsibilities of the controller. Other groupings that execute similar overall operations are understood within the scope of the present application. Definers, determiners, commanders, and/or control circuits may be implemented in hardware and/or as computer instructions on a non-transient computer readable storage medium and may be distributed across various hardware or computer based components.

Example and non-limiting implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to a specification, any actuator including at least an electrical, hydraulic, or pneumatic actuator, a solenoid, an op-amp, analog control elements (springs, filters, integrators, adders, dividers, gain elements), and/or digital control elements.

Figure 2:
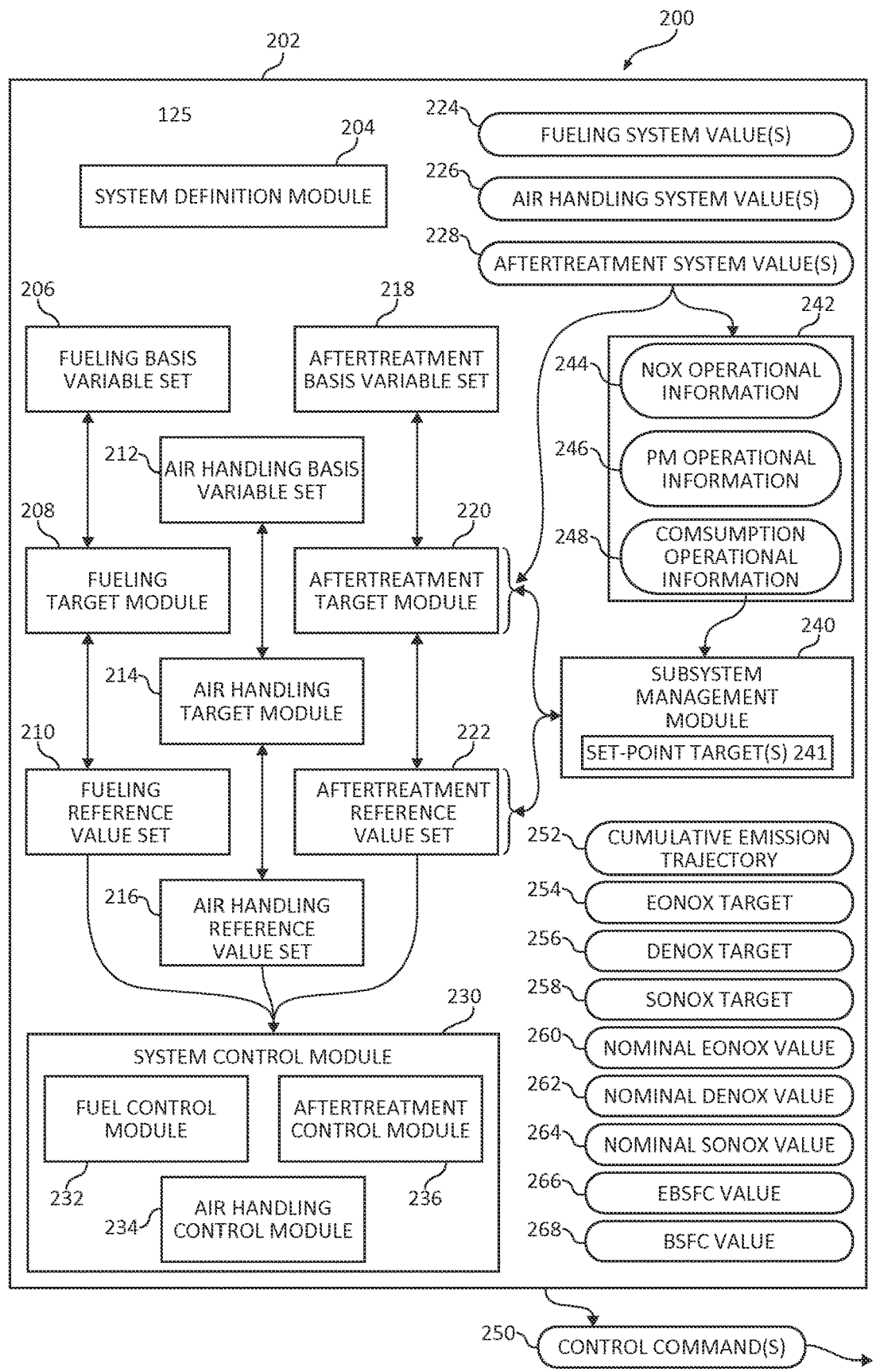
FIG. 2 is a schematic illustration of a processing subsystem including a controller to perform certain operations to control the fuel subsystem, the air handling subsystem, and the aftertreatment subsystem of FIG. 1, according to some embodiments of the disclosure.

FIG. 2 is a schematic illustration of an example processing subsystem 200 including a controller 125 to perform certain operations to control the fuel subsystem 110, the air handling subsystem 115, and/or the aftertreatment subsystem 120 shown in FIG. 1, according to some embodiments.

The controller 125 typically includes one or more parameters or data structures, such as but not limited to values, variables, commands, trajectories, targets, and sets thereof. These parameters or data structures may be provided to, provided by, and used by any of the definers, determiners, and commanders in the controller 125. Further, some parameters or data structures 202 are received by the controller 125 from a component external to the controller 125 or other source, which may be provided to and used by any of the operational structures in the controller 125 (e.g., definers, determiners, or commanders). Some parameters or data structures may also be provided by the controller 125 to a component external to the controller 125 or other destination, such as control command(s) 250. Data structures may be provided to the controller 125 as sensor measurements, which may be physical measurements or virtual measurements. Virtual sensor measurements are determined or interpreted from sensor measurements and/or other data structures in the controller 125. In some cases, virtual sensor measurements are the output of a definer, determiner, or commander of the controller 125.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The example controller 125 includes a system parameter definer 204. An example system parameter definer 204 interprets one or more parameters in the controller in response to received parameters 202 and/or other parameters in the controller 125. The interpreted parameters are provided to the controller 125 and are available for use by other operational structures (e.g., definers, determiners, commanders, or circuits).

In various embodiments, to perform the functions herein throughout discussed, the system parameter definer 204 may include, but is not limited to, a rotations per minute (RPM) sensor, an accelerator, an oxygen sensor, a temperature sensor, a pressure sensor (e.g., absolute or differential), a flow sensor, a humidity sensor, a $NO_X$ sensor, an ammonia sensor, an analog to digital (ADC) converter, a processor, a non-transient computer readable storage medium, computer readable instruction(s) stored on a non-transient computer readable storage medium, a bus, and/or wired/wireless connection hardware. In other embodiments, one or more of these may also be excluded from the system parameter definer 204.

In some embodiments, the fueling basis variable set 206 is interpreted by the system parameter definer 204. An example fueling basis variable set 206 characterizes closed cycle efficiency (CCE), which is a measure of the efficiency of combustion within the cylinder. The fueling target determiner 208 determines a fueling reference value set 210 in response to the fueling basis variable set 206. An example fueling reference value set 210 corresponds to target values for the fuel system 110 during operation. In various embodiments, some target values are conformed to a specification set of one or more physical controllers of the fuel system 110 (e.g., during calibration).

In various embodiments, to perform the functions herein throughout discussed, the fueling target determiner 208 may include, but is not limited to, a processor, a non-transient computer readable storage medium, computer readable instruction(s) stored on a non-transient computer readable storage medium, a bus, and/or a wired/wireless connection hardware. In other embodiments, one or more of these may also be excluded from the fueling target determiner 208.

An air handling basis variable set 212 may be interpreted by the system parameter definer 204. An example air handling basis variable set 212 characterizes open cycle efficiency (OCE), which is a measure of the efficiency of the engine system for bringing air into a cylinder before intake valve closing. The air handling target determiner 214 determines an air handling reference value set 216 in response to the air handling basis variable set 212. An example air handling reference value set 216 corresponds to target values for the air handling system 115 during operation. In various embodiments, some target values are conformed to a specification set of one or more physical controllers of the air handling system 115 (e.g., during calibration).

In various embodiments, to perform the functions herein throughout discussed, the air handling target determiner 214 may include, but is not limited to, a processor, a non-transient computer readable storage medium, computer readable instruction(s) stored on a non-transient computer readable storage medium, a bus, and/or wired/wireless connection hardware. In other embodiments, one or more of these may be excluded from the air handling target determiner 214.

In some embodiments, the aftertreatment basis variable set 218 is interpreted by the system parameter definer 204. The aftertreatment target determiner 220 determines an aftertreatment reference value set 222 in response to the aftertreatment basis variable set 218. An example aftertreatment reference value set 222 corresponds to target values for the aftertreatment system 120 during operation. In various embodiments, one or more target values are conformed to a specification set of one or more physical controllers of the aftertreatment system 120 (e.g., during calibration).

In various embodiments, to perform the functions herein throughout discussed, the aftertreatment target determiner 220 may include, but is not limited to, a processor, a non-transient computer readable storage medium, computer readable instruction(s) stored on a non-transient computer readable storage medium, a bus, and/or wired/wireless connection hardware. In other embodiments, one or more of these may be excluded from the aftertreatment target determiner 220.

An example aftertreatment basis variable set 218 includes a cumulative emission trajectory 252 to characterize a moving average of one or more emissions in one or more receding time horizons. An example cumulative emission trajectory 252 utilizes a time horizon over a day. Other non-limiting examples of cumulative emission trajectories utilize a time horizon over a week or a month. The cumulative emission trajectory 252 is optionally compared to a cumulative emission target, which is determined in response to any of a number of reasons. For example, a cumulative emission target may be set: to achieve long-term compliance with regulatory requirements; to trade-off emissions credits or actual emissions with another engine or another program (e.g. a set of engine types or company); and/or to meet a fleetwide emissions target. A person of ordinary skill in the art having the benefit of the disclosure herein would be enabled to set an appropriate cumulative emission target for any of these or similar reasons. An example aftertreatment reference value set 222 is determined to bend the cumulative emissions trajectory 252 toward the cumulative emission target, which is selected to increase or decrease cumulative emissions over a time period.

Further embodiments of the system parameter definer 204 interpret fueling system value(s) 224, air handling system value(s) 226, and/or aftertreatment system value(s) 228. The system value(s) 224, 226, 228 may be dynamic in character at a rate related to the response rate of the respective subsystem. Example rates for interpreting system value(s) 224, 226, 228 are faster than the response rate of the respective subsystem. The example system parameter definer 204 provides the system value(s) 224, 226, 228 to any one or more of the target determiners 208, 214, 220. Example reference value sets 210, 216, and 222 are further determined in response to the system value(s) 224, 226, 228.

Example fueling system values 224 include, without limitation, any temperature, flowrate, predicted efficiency (in any unit), and/or pressure for any fueling system component, such as a fuel rail pressure, a start-of-injection value, or a fueling amount value. Non-limiting examples of fueling system components include the fuel tank, the fuel rail, the fuel pump, and the fuel itself.

Example air handling system values 226 include, without limitation, the composition of air and/or charge gas, temperature (anywhere in the air handling system), volumetric or mass flowrate (anywhere in the air handling system), predicted efficiency (in any unit), and/or the pressure for any air handling system component, such as an in-cylinder $[O_2]$ value (oxygen concentration), a mass charge flow value, an exhaust manifold pressure (EMP) value, an exhaust manifold temperature (EMT) value, an intake manifold pressure (IMT) value, an intake manifold pressure (IMP) value, a trapped charge mass value, and an air-to-fuel ratio (AFR) value. Non-limiting examples of predicted efficiency include turbine efficiency, compressor efficiency, and the volumetric efficiency of the engine. Non-limiting examples of air handling system components include the turbocharger (any type), exhaust gas recirculation (EGR) system (including cooler, valve, bypass, main line, etc), cylinder valves, upstream intake valve, downstream exhaust valve, intercooler, manifolds, engine brake hardware, air filter, temperature sensors, pressure sensors, and delta pressure sensors.

Example aftertreatment system values 228 include, without limitation, the temperature (anywhere in the aftertreatment system), the flow rate through any aftertreatment component, the predicted efficiency of any aftertreatment component, the pressure drop of any aftertreatment component, the soot loading of any component, the ash loading of any component, the ammonia ($NH_3$) storage of any component, the $NO_X$ storage of any component, the regeneration need of any component, the time or distance to regeneration of any component, the excess conversion capacity of any component, the outlet composition of any component, the reductant fluid rate, the reductant fluid capability, a temperature requirement of any component, and a flow rate requirement of any component. Non-limiting examples of predicted efficiency include NO to $NO_2$ conversion rate, soot conversion by $NO_2$, soot conversion by $O_2$, $NO_X$ conversion into $N_2$ directly, $NH_3$ conversion on a cleanup catalyst, hydrocarbon oxidation conversion rate, and $NO_X$ conversion on a selective catalytic reduction (SCR) catalyst. Non-limiting examples of aftertreatment system components include oxidation catalyst, close-coupled catalyst, a reductant fluid injector, a decomposition residence volume, a $NO_X$ adsorber catalyst (NAC), a filter and/or catalyzed filter, a three-way and/or four-way catalyst, an SCR catalyst, an ammonia oxidation catalyst (AMOX), and bypasses of these.

The example controller 125 includes a subsystem manager 240 to coordinate and/or control the subsystems to meet a target system performance in response to operational information 242. System performance is managed by setting targets for the target determiners or the subsystem controllers associated with each subsystem. The subsystem manager recognizes that certain subsystems require cooperation from other subsystems in order to meet their targets. For example, the aftertreatment system may not be able to meet a particular $NO_X$ target or heat flux requirement without adjustments made upstream, in the fuel subsystem or the air handling subsystem. In this manner, the subsystem manager 240 facilitates management of compositions of matter that move through the engine system to achieve one or more overall system targets. Non-limiting examples of compositions to be managed include constituent values—such as the presence or absence of oxygen, inert materials, fuel amount, fuel composition, particulates, an emission (any type), a reductant, and/or an unburned hydrocarbon—and/or state values—such as a temperature, a pressure, a humidity, a heat capacity, an efficiency value (any type), a loading capacity, a flow capacity, and/or a space velocity.

In various embodiments, to perform the functions herein throughout discussed, the subsystem manager 240 may include, but is not limited to, a subsystem control circuit, a processor, a non-transient computer readable storage medium, computer readable instruction(s) stored on a non-transient computer readable storage medium, a bus, and/or wired/wireless connection hardware. In other embodiments, one or more of these may be excluded from the subsystem manager 240.

The example controller 125 can be described as having multiple control levels, with one level being superior to and capable of overriding an inferior control level. For example, subsystem manager 240 can be considered a level of control superior to a level of control including the one or more target determiners. The level of control including the one or more target determiners can be considered a level of control superior to a level of control including the subsystem controllers. The superior level of control provides targets to the inferior level of control for overall system control. However, the inferior level of control (e.g., aftertreatment target determiner) may also provide targets to the superior level of control (e.g., subsystem manager), which may be used to affect other operational structures (e.g., fuel target determiner) in the inferior level of control.

Target system performance may relate to any of cumulative emissions, equivalent brake specific fuel consumption (EBSFC), brake specific fuel consumption (BSFC), energy availability or total energy at the input of the aftertreatment system, and/or the ratio of natural gas fuel to diesel fuel. Brake power information is obtained optionally from a virtual torque sensor or an actual torque sensor. Some targets relate to optimal system performance and/or improved system performance in relation to a nominal system performance. Nominal system performance as used herein includes, but is not limited to, performance of the system without the operations of the subsystem manager, operations of the system under normal conditions, and/or operations of the system without any adjustments from nominal target values. Examples of optimal and/or incrementally improved system performance include minimizing or improving a cost function of any type (e.g., fuel consumption, an emissions output, or component utilization) or maximizing or improving performance of any type (e.g. torque output, service life of any component, or passive regeneration of particulates).

Optimal or incrementally improved system performance depends on the mode of the engine (e.g., nominal operation or thermal management), the type of aftertreatment (e.g., including $NO_X$ aftertreatment or no SCR aftertreatment), and/or the type of fuel (e.g., diesel, natural gas, or dual fuel). Non-limiting examples of optimal system performance targets include minimizing an equivalent brake-specific fuel consumption (EBSFC) for fuel and diesel exhaust fluid (DEF) in an engine system having an SCR; minimizing a brake-specific fuel consumption (BSFC) in an engine system without an SCR; and maximizing a substitution ratio (e.g., natural gas/diesel fuel quantity) in an engine system utilizing dual-fuel capabilities (e.g. natural gas and diesel fuel). Further non-limiting examples of optimal target system performance targets relate to improving and/or optimizing reductant fluid consumption, catalyst life usage for any selected aftertreatment component, and EGR valve cycling per unit time (e.g., to maximize EGR valve life).

Example operational information 242 is a set of parameters that relate to variables of interest (e.g. engine states and aftertreatment states) and constraints (e.g., mechanical constraints including peak cylinder pressure (PCP) and turbo speed) within the system. Operational information 242 is selected to manage the system and meet a specific target system performance. Example specific targets include, but are not limited to, $NO_X$ at various points in the system, PM production and regeneration in the system, hydrocarbon production in the system, CO or $CO_2$ production in the system, and fuel and/or other fluid consumption in the system. Operational information 242 optionally includes or is interpreted in response to fueling system value(s) 224, air handling system value(s) 226, and/or aftertreatment system value(s) 228. In addition, operational information 242 includes or is interpreted in response to one or more variable sets 206, 212, 218.

As illustrated, the example operational information 242 is organized to meet $NO_X$, PM, and/or consumption specific targets within the system 100. The organized subsets include $NO_X$ operational information 244, particulate matter (PM) operational information 246, and/or consumption operational information 248 (any type or combination, including reductant consumption). Additionally or alternatively, operational information 242 relates to the temperature of component, the number of cycles used by a valve, run-time utilization, or the temperature gradient across a catalyst substrate.

Non-limiting examples of $NO_X$ operational information 244 include a nominal $EONO_X$ value 260, a nominal $DENO_X$ value 262, a nominal $SONO_X$ value 264, an NO amount, an $NO_2$ amount, an NO and/or $NO_2$ to $NO_X$ ratio, a $NO_X$ conversion efficiency, an ammonia storage capacity, a heat demand by the aftertreatment system, a torque demand, a torque feedback value (e.g. from a virtual or actual sensor), a subsystem state, an EBSFC 266, BSFC 268, an unburned hydrocarbon amount, a composition of the PM, and/or combinations of these. A nominal value may include a regulatory value, a value under normal operations, and a value that would occur if other adjustments currently being operated were not in operation.

Non-limiting examples of PM operational information 246 include a soot loading value, a soot composition value (e.g., particulates versus organic fraction), and an ash production value. Non-limiting examples of consumption operational information 248 include an EBSFC value 266, a diesel fuel consumption rate, and/or a reductant fluid consumption rate.

In some embodiments, the example subsystem manager 240 provides set-point target(s) 241 to one or more of the target determiners 208, 214, 220. Each of the target determiners 208, 214, 220 then adjusts operation to meet the set-point target. Adjusting operation includes determining or modifying one or more reference value sets in response to the set-point target(s) 241.

Non-limiting types of set-point target(s) 241 include optimal set-points, improved set-points, calibrated set-points, and initial reference set-points. Any set-points or types of set-points known in the art or any set-point generation method known in the art may be used. Non-limiting examples of set-point targets include a CCE, a post fueling amount, an oxygen concentration, a charge-to-fuel ratio (CFR), a differential pressure target (ΔP), and an SCR conversion efficiency. A person having skill in the art having the benefit of the disclosure herein and information about the particular system 100 would be able to select particular set-points to manage subsystems to meet overall system targets in response to operational information 242 to achieve improvement and/or optimization to meet a target system performance with the subsystem manager 240.

Alternative to, or in addition to, providing set-point target(s) 241, the example subsystem manager 240 optionally receives a set-point target from one or more of the subsystems. In response, the example subsystem manager 240 optionally provides one or more set-point targets 241 to other subsystems. In one example, the aftertreatment provides a $SONO_X$ set-point target to the aftertreatment subsystem and/or the subsystem manager 240. In response, the example subsystem manager 240 provides a set-point target to the fuel subsystem and/or the air handling subsystem, which for example, facilitate achieving the $SONO_X$ set-point target or take advantage of excess capacity in the system (e.g., excess SCR capacity) while achieving the $SONO_X$ set-point target.

In the illustrated embodiment, the example subsystem manager 240 is in operative communication with one or more target determiners 208, 214, 220 to send and receive the operational information 242, constraints, and/or set-point target(s) 241. In such arrangement, the subsystem manager 240 is positioned to coordinate (e.g., optimize to a target, minimum, or maximum) the subsystems to achieve an overall target system performance.

Particular types of set-point targets 241 are provided to target determiners selected to achieve the target. The example subsystem manager 240 provides set-point target(s) 241, such as an engine-out $NO_X$ ($EONO_X$) target 254 to the fueling target determiner 208, a $NO_X$ conversion ($DENO_X$) target 256 to the air handling target determiner 214, and/or a system out $NO_X$ ($SONO_X$) target 258 to the aftertreatment target determiner 220 in response to $NO_X$ operational information 244 to minimize EBSFC while meeting regulatory $NO_X$ values. For example, the $EONO_X$ target value 254 is increased above a nominal $EONO_X$ value 260 when the operational information indicates the SCR has excess conversion capacity at a particular SCR temperature without needing more reductant fluid.

In some embodiments, nominal values are provided by the respective target determiner, and the target determiner receives a modified target value as the set-point target 241 from the subsystem manager 240. In an example embodiment, the fueling target determiner 208 determines a nominal $EONO_X$ value 260. The example fueling target determiner 208 provides the nominal $EONO_X$ value 260 to the subsystem manager 240. The nominal $EONO_X$ value 260 is optionally modified. The subsystem manager 240 determines an $EONO_X$ target 254 in response to the nominal $EONO_X$ value 260 and operational information 242, such as NOX operational information 244. The $EONO_X$ target 254 is provided to the fueling target determiner 208 as a set-point target 241. The fueling target determiner 208 determines the fueling reference value set 210 in response to one or more of the $EONO_X$ target 254 as the set-point target 241 and the fueling basis variable set 206.

In a similar manner, the air handling target determiner 214 optionally determines a nominal $DENO_X$ value 262 for $DENO_X$ target 256. The aftertreatment target determiner 220 also optionally determines a nominal $SONO_X$ value 264 for $SONO_X$ target 258.

In various embodiments, the subsystem manager 240 optionally determines one or more reference value sets 210, 216, 222. The one or more reference value sets 210, 216, 222 are determined by the example subsystem manager 240 in response to operational information 242.

In some embodiments, reference value sets 210, 216, 222 are optionally determined by modifying initial reference value sets provided by the respective target determiner 208, 214, 220. In such embodiments, the modified reference value sets 210, 216, 222 are provided back to the respective target determiners from the subsystem manager 240.

Optionally, the target determiners are overridden by the subsystem manager 240. For example, an override optionally occurs when the subsystem manager 240 determines a particular reference value for a subsystem (e.g., post fueling amount) in response to another subsystem requesting a particular target value (e.g., aftertreatment heat flux). In such cases, reference value sets 210, 216, 222 are optionally provided directly to the system control commander 230 (e.g., system control circuit) or are passed through a target determiner 208, 214, 220 to the system control commander.

Some embodiments of the subsystem manager 240 iteratively determine or modify the set-points or reference value sets 210, 216, 222 at the end of a cycle of iteration(s), which may be determined in response to achieving a target value, reaching a predetermined time limit, or meeting some other condition (e.g., a subsystem requesting or requiring a control command).

The example subsystem manager 240 models the operational information 242 at least one time step ahead, for example, to predict or estimate some of the operational information 242. Non-limiting examples of at least one time step ahead include one time-step ahead, two time-steps ahead, three-time steps ahead, four-time steps ahead, or five-time steps ahead. Non-limiting examples of a time step include a processor execution step, a modeling iteration step, and a discrete time interval. Example reference value sets 210, 216, 222 are further determined and/or modified in response to the modeled operational information.

The one or more reference value sets 210, 216, 222 are provided to the system control commander 230 for determining control command(s) 250 in response to the reference value set(s). An example system control commander 230 includes a fuel control commander 232, an air handling control commander 234, and/or an aftertreatment control commander 236. Each example control commander 232, 234, 236 provides one or more command(s) 250 to the respective subsystem. The control command(s) 250 include (e.g., pass through) or are interpreted in response to the one or more reference values from the reference value sets 210, 216, 222. In various embodiments, one or more of the control commanders 230, 232, 234, 236 comprise a respective control circuit (e.g., a system control circuit, a fuel control circuit, an air handling control circuit, and/or an aftertreatment control circuit).

Each control commander 232, 234, 236 is optionally calibrated to a particular subsystem, for example, to adjust for manufacturing variances. The calibrated system control commander 230 selectively provides the control command(s) 250 in response to the calibration(s). To the extent that the control command(s) 250 include the one or more reference value sets 210, 216, 222, the reference value sets are optionally modified in response to the calibration.

In various embodiments, to perform the functions herein throughout discussed, the fuel control commander 232 may include, but is not limited to, a fuel injector, a fuel rail pressure pump, a processor, a non-transient computer readable storage medium, computer readable instruction(s) stored on a non-transient computer readable storage medium, a bus, and/or wired/wireless connection hardware. In other embodiments, one or more of these may also be excluded from the fuel control commander 232.

In additional or alternative embodiments, the fuel control commander 232 comprises a fuel control circuit. To perform the functions described herein throughout, an example fuel control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the fuel control circuit.

In various embodiments, to perform the functions herein throughout discussed, the air handling control commander 234 may include, but is not limited to, an EGR valve, a VGT, an engine fan, a fuel injector, a fuel rail pressure pump, a processor, a non-transient computer readable storage medium, computer readable instruction(s) stored on a non-transient computer readable storage medium, a bus, and/or wired/wireless connection hardware. In other embodiments, one or more of these may be excluded from the air handling control commander 234.

In additional or alternative embodiments, the air handling control commander 234 comprises an air handling control circuit. To perform the functions described herein throughout, an example air handling control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the air handling control circuit.

In various embodiments, to perform the functions herein throughout discussed, the aftertreatment control commander 236 may include, but is not limited to, a diesel exhaust fluid (DEF) valve, an ammonia fluid valve, a fuel injector, an EGR valve, a VGT, a processor, a non-transient computer readable storage medium, computer readable instruction(s) stored on a non-transient computer readable storage medium, a bus, and/or wired/wireless connection hardware. In other embodiments, one or more of these may be excluded from the aftertreatment control commander 236.

In additional or alternative embodiments, the aftertreatment control commander 236 comprises an aftertreatment control circuit. To perform the functions described herein throughout, an example aftertreatment control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the aftertreatment control circuit.

The control command(s) 250 are received by the example controllers 112, 117, 124 of each subsystem 110, 115, 120. In response, the fuel system 110, the air handling system 115, and/or the aftertreatment system 120 operates in response to the control command(s) 250.

The subsystems 110, 115, 120 have different response times or rates, for example, on different orders of magnitude. Thus, the example target determiners 208, 214, 220 and example control commanders 232, 234, 236 update at intervals in response to the respective subsystem such that the determiners, commanders, and/or circuits update at a similar rate as the corresponding subsystem. For example, when the fuel subsystem 110 has a response time on the order of milliseconds, the fueling target determiner 208 and fuel control commander 232 also update on a similar interval.

However, an example air handling subsystem 115 has a response time on the order of seconds, which is at least an order of magnitude slower than the fuel subsystem 110. The example air handling target determiner 214 and the example air handling control commander 234 then update on a similar interval to the air handling subsystem 115, which is at least an order of magnitude slower than the fuel-related structures, such as fueling target determiner 208 and fuel control commander 232.

Even though the example controller 125 overall updates on the order of milliseconds to provide robust control for the fuel subsystem 110, the processing for the example air handling subsystem 115 is updated at a much lower rate while still providing robust control. Establishing a lower rate of updating for the air handling-related structures, such as air handling target determiner 214 and air handling control commander 234, reduces overall processing requirements by providing updates at a rate appropriate to a particular subsystem. Furthermore, when the example aftertreatment subsystem 120 has a response time on the order of minutes, the same reduction in overall processing requirements may be achieved by establishing an even lower rate of updating for the aftertreatment-related structures, such as aftertreatment target determiner 220 and aftertreatment control commander 236.

The division of processing by time constant facilitates flexible hardware configurations. For example, processing may be distributed across processing units with varying speeds and/or across processing cores within the same processing unit. Slower and less expensive processing units may be used for a slower rate of control for slower subsystems, and faster more expensive processing unit may be used for a faster rate of control for faster subsystems. Furthermore, distributed processing in a multi-processor or multi-engine control commander (ECM) architecture facilitates modularity of the engine system, particularly for the processing subsystem. One having ordinary skill in the art, having the benefit of the disclosure herein, would recognize that the benefits of the present disclosure may be achieved even with a single processor executing instructions at varying time constants, for example not executing aftertreatment operations every execution cycle, to provide robust control with reduced processing requirements.

Figure 3:
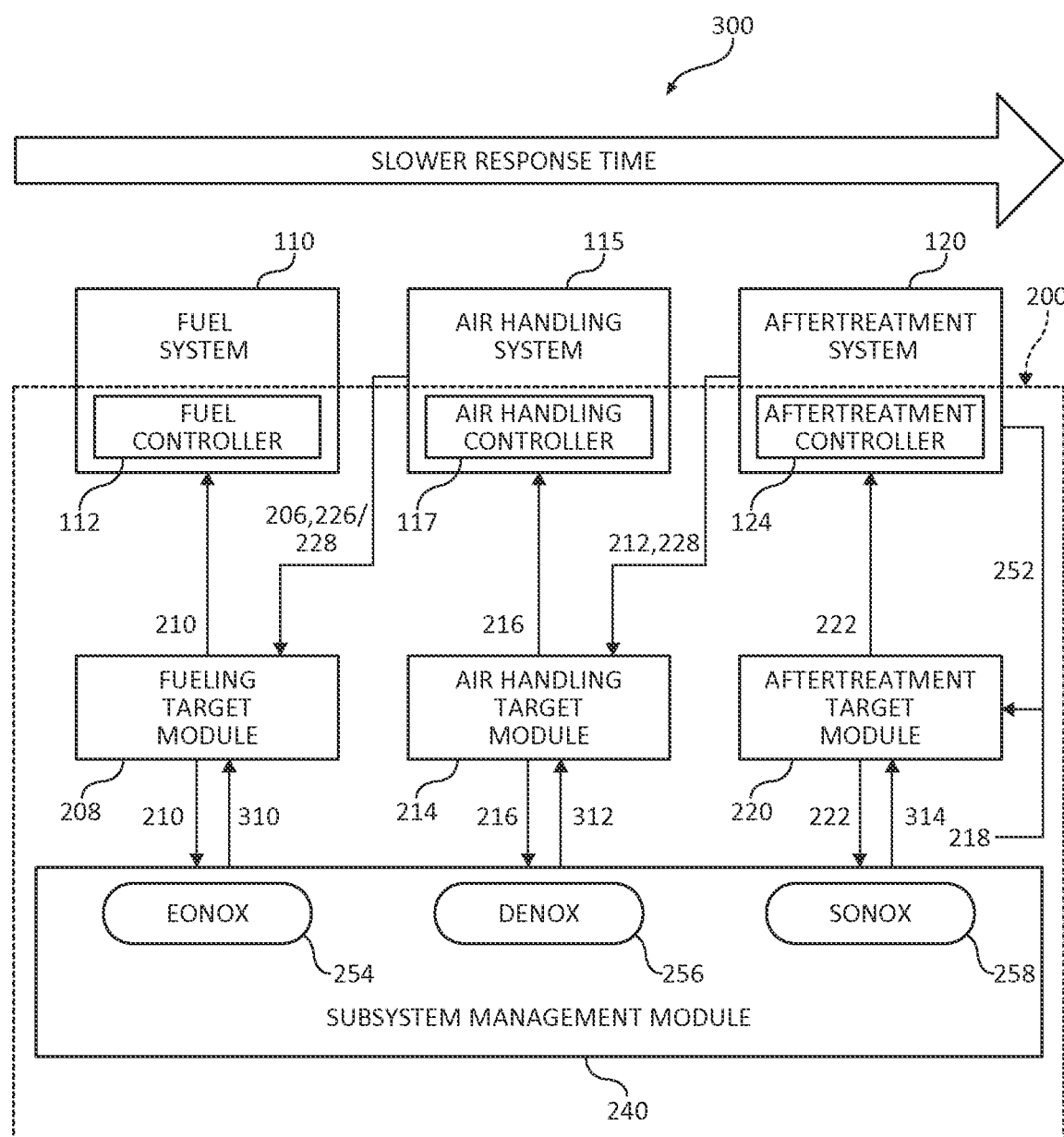
FIG. 3 is a schematic illustration of an engine system showing the flow of parameters between subsystems having different response times, according to some embodiments of the disclosure.

Additionally, the processing requirements of an example system are further reduced by establishing a flow of parameters between the operational structures corresponding to each subsystem, perhaps as best shown in FIG. 3. One of skill in the art, having the benefit of the disclosures herein, will recognize that the processing subsystem 200 and the controller 125 perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, aftertreatment systems therefore, air handling devices therefore, and intake and exhaust devices therefore.

FIG. 3 is another schematic illustration of example system 100 showing the flow of parameters between subsystems having different response times, according to some embodiments. Generally, a slower response time corresponds to a lower response speed, whereas a faster response time corresponds to a greater response speed. The subsystems 110, 115, 120 are illustrated from left to right in the order of increasingly slower response time. The fuel system 110 has the fastest response time. The example air handling system 115 has a slower response time than the fuel system, for example, at least an order of magnitude slower. The aftertreatment system 120 has a slower response time than air handling system 115, for example, at least an order of magnitude slower.

As shown, the example processing subsystem 200 includes fuel controller 112 as part of fuel system 110, air handling controller 117 as part of air handling system 115, and aftertreatment controller 124 as part of aftertreatment system 120. The response times of each controller 112, 117, 124 are similar to the response times of the respective subsystem, or are at least on the same order of magnitude.

Example processing subsystem 200 also includes fueling target determiner 208, air handling target determiner 214, and aftertreatment target determiner 220. The target determiners 208, 214, 220 are in operative communication with the controllers 112, 117, 124. A system control commander as shown in FIG. 2 is not shown here but may be included and in operative communication with the target determiners and the controllers. A system parameter definer as shown in FIG. 2 is also not shown here but may be included and in operative communication with the subsystems (e.g., to a sensor or a controller) and the target determiners.

The target determiners 208, 214, 220 determine and provide reference value sets 210, 216, 222. Each target determiner has a response time similar to or at least on the same order of magnitude as the corresponding subsystem. The controllers 112, 117, 124 operate their respective subsystems in response to the respective reference value sets 210, 216, 222.

The reference value sets 210, 216, 222 are determined in response to basis variable sets 206, 212, 218. As can be seen, the fueling basis variable set 206 includes at least one air handling system value 226 and/or at least one aftertreatment system value 228. Although the system values 226, 228 may be dynamic, because the air handling system 115 has a slower response time than the fuel system 110, the air handling system value(s) 226 may be treated as static for one or more time steps by the fueling target determiner 208 for determining the fueling reference value set 210. In a similar manner, because the aftertreatment system 120 has a slower response time than the air handling system 115, the aftertreatment system value(s) 228 may be treated as static for one or more times steps by the air handling target determiner 214 for determining the air handling reference value set 216.

When operational, the system 100 produces emissions over time, for example, at the tailpipe of aftertreatment system 120. The cumulative emissions may be measured on the order of several minutes or hours and be estimated as a cumulative emission trajectory 252. Although the cumulative emission trajectory 252 may be dynamic, the aftertreatment target determiner 220 may treat the cumulative emission trajectory 252 as static for one or more time steps for determining the aftertreatment reference value set 222.

In operation, an aftertreatment reference value set 222 is determined in response to an aftertreatment basis variable set 218, which may include a cumulative emission trajectory 252, at a time period determined in response to the response time of the aftertreatment system 120 and/or aftertreatment controller 124. The aftertreatment reference value set 222 includes targets for controlling the aftertreatment system 120. The conditions in the aftertreatment system 120 may be available as aftertreatment system value(s) 228 in the processing subsystem 200.

The air handling reference value set 216 is determined in response to an air handling basis variable set 212, which may include the aftertreatment system value(s) 228, at a time period determined in response to the response time of the air handling system 115 and/or air handling controller 117. The conditions in the air handling system 115 may be available as air handling system value(s) 226 in the processing subsystem 200.

The fueling reference value set 210 is determined in response to a fueling basis variable set 206, which may include the aftertreatment system value(s) 228 and/or the air handling system value(s) 226, at a time period determined in response to the response time of the fuel system 110 and/or fuel controller 112.

An example time period for the air handling reference value set 212 is greater than the time period for the fueling reference value set 210. An example time period for the aftertreatment reference value set 222 is greater than the time period for the air handling reference value set 216. Although the time periods for determining each reference value set are different in duration, the time periods may overlap. The determination of each reference value set is not necessarily tied to waiting for another reference value set to be determined.

The ordered flow of parameters from slower response time subsystems to control structures corresponding to faster response time subsystems and the significant difference (e.g., an order of magnitude) in response times between subsystems allows for a cascaded parameters and hierarchical time-divided control scheme for robustly operating system 100. Overall reductions in processing, memory, and calibration time requirements are achieved.

The example processing subsystem 200 further includes subsystem manager 240. As illustrated, the example subsystem manager 240 provides one or more set-point target(s) 310, 312, 314 to the target determiners 208, 214, 220 to coordinate the subsystems 110, 115, 120 to achieve a target system performance. An example set-point target 310 provided to the fueling target determiner 208 is a target $EONO_X$ value 254. An example set-point target 312 provided to the air handling target determiner 214 is a target $DeNO_X$ value 256. An example set-point target 314 provided to the aftertreatment target determiner 314 is a target $SONO_X$ value 258. The target determiners 208, 214, 220 optionally determine and provide reference value sets 210, 216, 222 in response to the set-point targets 310, 312, 314. In some embodiments, the set-point targets 310, 312, 213 are provided in response to the subsystem manager 240 receiving the reference value sets 210, 216, 222.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the invention should, therefore, be determined with reference to the appended claims, along with the full scope of equivalents to which such claims are entitled.

The following is claimed:

1. A system comprising:
    a fuel system having a first response time;
    an air handling system having a second response time, the second response time being slower than the first response time;
    an aftertreatment system having a third response time, the third response time being slower than the second response time; and
    a controller configured to:
        interpret a first basis variable set for the fuel system, a second basis variable set for the air handling system, and a third basis variable set for the aftertreatment system;
        determine a first reference value set in response to the first basis variable set at a rate based on the first response time;
        determine a second reference value set in response to the second basis variable set at a rate based on the second response time;
        determine a third reference value set in response to the third basis variable set at a rate based on the third response time; and
        provide one or more control commands to each of the fuel system, the air handling system, and the aftertreatment system in response to the first reference value set, the second reference value set, and the third reference value set, respectively.

2. The system of claim 1, wherein the controller is further configured to interpret operational information, including $NO_X$ operational information, and to selectively modify at least one of the first reference value set, the second reference value set, and the third reference value set in response to the $NO_X$ operational information.

3. The system of claim 2, wherein the controller is configured to selectively provide at least one of a target $NO_X$ conversion efficiency ($DeNO_X$) value, a target system out $NO_X$ ($SONO_X$) value, and a target engine out $NO_X$ ($EONO_X$) value to at least one of the fueling target determiner, the air handling target determiner, and the aftertreatment target determiner in response to the $NO_X$ operational information.

4. The system of claim 3, wherein the $NO_X$ operational information includes at least one of a nominal $DeNO_X$ value, a nominal $SONO_X$ value, and a nominal $EONO_X$ value.

5. The system of claim 1, wherein the controller is further configured to interpret particulate matter (PM) operational information and to selectively modify at least one of the first reference value set, the second reference value set, and the third reference value set in response to the PM operational information.

6. The system of claim 1, wherein the controller is further configured to interpret consumption operational information and to selectively modify at least one of the first reference value set, the second reference value set, and the third reference value set in response to the consumption operational information.

7. The system of claim 6, wherein the consumption operational information includes an equivalent brake specific fuel consumption (EBSFC) value, wherein the brake power information is obtained either from a virtual torque sensor or an actual torque sensor.

8. The system of claim 1, wherein the controller is further configured to iteratively modify at least one of the first reference value set, the second reference value set, and the third reference value set in response to operational information.

9. The system of claim 8, wherein the controller is further configured to model the operational information at least one time step ahead and to further selectively modify at least one of the first reference value set, the second reference value set, and the third reference value set in response to the modeled operational information.

10. The system of claim 1, wherein the third basis variable set includes a cumulative emission trajectory, and the aftertreatment target determiner is further structured to provide the third reference value set in response to the cumulative emission trajectory.

11. The system of claim 1, wherein the aftertreatment system includes a selective catalytic reduction (SCR) system structured to chemically reduce components of the exhaust, the SCR system being responsive to at least one reference value of the third reference value set.

12. The system of claim 1, wherein the aftertreatment system includes a $NO_X$ reductant fluid system structured to provide $NO_X$ reductant fluid to the exhaust, the $NO_X$ reductant fluid system being responsive to at least one reference value of the third reference value set.

13. A controller comprising:
    a system parameter definer structured to interpret an aftertreatment basis variable set, an air handling basis variable set including an aftertreatment system value, and a fueling basis variable set including at least one of an aftertreatment system value and an air handling system value;
    an aftertreatment target determiner structured to determine an aftertreatment reference value set in response to the aftertreatment basis variable set at an aftertreatment subsystem update rate;
    an air handling target determiner structured to determine an air handling reference value set in response to the air handling basis variable set at an air handling subsystem update rate faster than the aftertreatment subsystem update rate; and
    a fueling target determiner structured to determine a fueling reference value set in response to the fueling basis variable set at a fueling subsystem update rate faster than the air handling subsystem update rate.

14. The controller of claim 13, further including a system control circuit comprising at least one of a fuel control circuit, an air handling control circuit, and an aftertreatment control circuit and structured to provide one or more control commands in response to the first reference value set, the second reference value set, and the third reference value set.

15. The controller of claim 13, wherein the first basis variable set includes a cumulative emission trajectory, and the aftertreatment target determiner is further structured to provide the first reference value set in response to the cumulative emission trajectory.

16. The controller of claim 13, wherein the controller further comprises a subsystem manager structured to interpret $NO_X$ operational information and to modify at least one of the first reference value set, the second reference value set, and the third reference value set in response to the $NO_X$ operational information.

17. The controller of claim 16, wherein the subsystem manager is structured to selectively provide at least one of a target $NO_X$ conversion efficiency ($DeNO_X$) value, a target system out $NO_X$ ($SONO_X$) value, and a target engine out $NO_X$ ($EONO_X$) value to at least one of the fueling target determiner, the air handling target determiner, and the aftertreatment target determiner in response to the $NO_X$ operational information.

18. The controller of claim 17, wherein the $NO_X$ operational information includes at least one of a nominal $DeNO_X$ value, a nominal $SONO_X$ value, and a nominal $EONO_X$ value.

19. The controller of claim 13, wherein the controller further comprises a subsystem manager structured to interpret particulate matter (PM) operational information and to selectively modify at least one of the first reference value set, the second reference value set, and the third reference value set in response to the PM operational information.

20. The controller of claim 13, wherein the controller further comprises a subsystem manager structured to interpret consumption operational information and to selectively modify at least one of the first reference value set, the second reference value set, and the third reference value set in response to the consumption operational information.

21. The controller of claim 20, wherein consumption operational information includes an equivalent brake specific fuel consumption (EBSFC) value, wherein the brake power information is obtained either from a virtual torque sensor or an actual torque sensor.

22. The controller of claim 13, wherein the controller further comprises a subsystem manager structured to interpret operational information to iteratively modify at least one of the first reference value set, the second reference value set, and the third reference value set in response to the operational information.

23. The controller of claim 22, wherein the subsystem manager is further structured to model the operational information at least one time step ahead and to further selectively modify at least one of the first reference value set, the second reference value set, and the third reference value set in response to the modeled operational information.

24. The controller of claim 13, wherein the system parameter definer interprets the aftertreatment system value and the air handling system value at rates related, respectively, to a response rate of an aftertreatment system and an air handling system.

* * * * *